US009092037B2

(12) United States Patent
Hii (10) Patent No.: US 9,092,037 B2
(45) Date of Patent: Jul. 28, 2015

(54) PRESSURE-REGULATING VALVE (75) Inventor: Sing Chuang Hii, Quakers Hill (AU)

(73) Assignee: 3M Innovative Properties Company, St. Paul, MN (US)

( * ) Notice: Subject to any disclaimer, the term of this patent is extended or adjusted under 35 U.S.C. 154(b) by 370 days.

(21) Appl. No.: 13/575,660

(22) PCT Filed: Feb. 7, 2011

(86) PCT No.: PCT/US2011/023871
§ 371 (c)(1),
(2), (4) Date: Jul. 27, 2012

(87) PCT Pub. No.: WO2011/100184
PCT Pub. Date: Aug. 18, 2011

(65) Prior Publication Data
US 2012/0291887 A1 Nov. 22, 2012

Related U.S. Application Data (60) Provisional application No. 61/303,135, filed on Feb. 10, 2010.

(51) Int. Cl.
*G05D 16/06* (2006.01)
*G05D 16/10* (2006.01)
(52) U.S. Cl.
CPC .................................. *G05D 16/106* (2013.01)
(58) Field of Classification Search
CPC .... G05D 16/10; G05D 16/103; G05D 16/106
USPC ............ 137/505.25, 505.38, 599.01–601.21, 137/512.1
See application file for complete search history.

(56) References Cited

U.S. PATENT DOCUMENTS

| 1,356,579 | A | * | 10/1920 | Witman | 251/255 |
| 2,426,639 | A | * | 9/1947 | O'Leary | 417/279 |
| 2,600,137 | A | * | 6/1952 | Teague, Jr. | 137/505.25 |
| 2,675,649 | A | * | 4/1954 | Trevaskis et al. | 137/505.25 |
| 2,997,059 | A | * | 8/1961 | Mortimer | 137/505.13 |
| 3,253,608 | A | * | 5/1966 | Davis | 137/220 |
| 3,435,843 | A | * | 4/1969 | Spencer | 137/505.25 |
| 3,538,930 | A | * | 11/1970 | Kowalski | 137/81.2 |
| 3,685,533 | A | * | 8/1972 | Krechel | 137/115.05 |
| 4,027,923 | A | * | 6/1977 | Saito | 303/9.71 |
| 4,083,380 | A | * | 4/1978 | Huber | 137/505.25 |
| 4,341,235 | A | * | 7/1982 | Nord | 137/312 |

(Continued)

FOREIGN PATENT DOCUMENTS

| CN | 1127861 A | 7/1996 |
| EP | 1 727 013 A2 | 11/2006 |
| JP | 2001-343082 A | 12/2001 |

OTHER PUBLICATIONS

International Search Report, PCT/US2011/023871, mailed Apr. 8, 2011, 3 pages.

*Primary Examiner* — William McCalister
(74) *Attorney, Agent, or Firm* — Bradford B. Wright (57) ABSTRACT

A pressure-regulating valve comprises: a core assembly, a slidable member, and a biasing member. The core assembly comprises an intake section, a diverter section and an output section. The slidable member has a collar and at least one internal flow path terminating at first and second openings in its inner surface. If the slidable member is in a first position, fluid can pass through the valve. If the slidable member is in a second position, fluid cannot pass through the valve.

13 Claims, 7 Drawing Sheets

(56) References Cited

U.S. PATENT DOCUMENTS

| | | | |
|---|---|---|---|
| 4,438,980 A | 3/1984 | Lippiatt | |
| 4,467,828 A * | 8/1984 | Gneiding | 137/484.4 |
| 4,481,969 A * | 11/1984 | Fallon et al. | 137/116.5 |
| 4,543,985 A * | 10/1985 | Healy et al. | 137/505.25 |
| 5,257,646 A * | 11/1993 | Meyer | 137/505.25 |
| 5,348,269 A * | 9/1994 | Moseley | 251/33 |
| 5,396,918 A * | 3/1995 | Parker | 137/14 |
| 5,860,447 A * | 1/1999 | Chu | 137/505.25 |
| 5,860,448 A * | 1/1999 | Lee et al. | 137/508 |
| 5,875,815 A * | 3/1999 | Ungerecht et al. | 137/505.25 |
| 5,881,757 A * | 3/1999 | Kuster et al. | 137/15.19 |
| 5,904,177 A * | 5/1999 | Mullin et al. | 137/503 |
| 5,921,275 A * | 7/1999 | Knop et al. | 137/498 |
| 5,931,182 A * | 8/1999 | Craft et al. | 137/116.5 |
| 6,047,727 A * | 4/2000 | Hatori et al. | 137/505.28 |
| 6,135,135 A | 10/2000 | Futa, Jr. | |
| 6,374,853 B1 * | 4/2002 | Callies | 137/495 |
| 6,446,613 B1 | 9/2002 | Djordjevic | |
| 6,779,554 B2 | 8/2004 | Weis et al. | |
| 7,048,000 B2 * | 5/2006 | Koelzer | 137/505.25 |
| 7,159,611 B2 * | 1/2007 | Larsen | 137/505.25 |
| 7,182,857 B2 * | 2/2007 | Koslow et al. | 210/97 |
| 7,275,559 B2 * | 10/2007 | Morrison et al. | 137/505.25 |
| 7,546,846 B2 | 6/2009 | Massengale et al. | |
| 7,654,282 B2 * | 2/2010 | Lo | 137/505.25 |
| 7,828,009 B2 * | 11/2010 | Neumann et al. | 137/505.25 |
| 2004/0231727 A1 * | 11/2004 | Nomichi et al. | 137/505.25 |
| 2005/0194046 A1 * | 9/2005 | Koelzer | 137/505.25 |
| 2006/0086391 A1 * | 4/2006 | Youngberg et al. | 137/505.25 |
| 2007/0028966 A1 * | 2/2007 | Feith | 137/505.25 |
| 2007/0199876 A1 | 8/2007 | Tubby et al. | |
| 2008/0216480 A1 | 9/2008 | Harmon | |

* cited by examiner

PRESSURE-REGULATING VALVE

CROSS-REFERENCE TO RELATED APPLICATIONS

This application is a national stage filing under 35 U.S.C. §371 of PCT/US2011/023871, filed Feb. 7, 2011, which claims priority to U.S. Provisional Application No. 61/303,135, filed Feb. 10, 2010, the disclosures of which are incorporated by reference in their entirety herein.

TECHNICAL FIELD

The present disclosure broadly relates to valves for regulating flow of a fluid.

BACKGROUND

In fluid handling systems, it is frequently advantageous to control the fluid pressure at one or more points within the system to avoid damage to components (e.g., rupture and/or leakage). There is a continuing need to methods to control fluid pressure within fluid handling systems such as, for example, water purification apparatus.

SUMMARY

In one aspect, the present disclosure provides a pressure-regulating valve comprising:
a core assembly comprising:
an intake section comprising a conduit defining an inlet orifice and an intake flow path;
a diverter section comprising a cap adjacent at least one spacer abutting the conduit and creating at least one outward passage in fluid communication with the intake flow path; and
an output section having an outlet orifice abutting the diverter section and defining an output flow path;
a slidable member having an inner surface engaging the core assembly and slidable between a first position and a second position, and wherein the slidable member comprises:
an upstream portion that engages the core assembly at a first peripheral seal; and
a downstream portion in contact with the upstream portion and defining an internal flow path terminating at first and second openings at the inner surface, wherein the downstream portion comprises a pressure surface facing downstream, wherein the downstream portion comprises a collar adapted to engage the core assembly at a second peripheral seal and a third peripheral seal, and wherein the second peripheral seal is disposed between the first peripheral seal and a third peripheral seal; and
a biasing member that urges the slidable member from the second position toward the first position,
a biasing member that urges the slidable member from the second position toward the first position, wherein if the slidable member is in the first position, the outlet orifice and the inlet orifice are in fluid communication through the internal flow path, wherein if the slidable member is in the second position, the outlet orifice and the inlet orifice are not fluid communication through the internal flow path, and wherein, in response to a downstream fluid pressure against the pressure surface, the slidable member is movable from the first position toward the second position.

In some embodiments, the downstream fluid pressure is substantially independent of a upstream fluid pressure at the inlet orifice. In some embodiments, the intake section, the diverter section and the output section are discrete bodies. In some embodiments, at least two of the intake section, the diverter section and the output section are integrally formed as a single body. In some embodiments, the third peripheral seal is disposed on the diverter section. In some embodiments, the pressure-regulating valve further comprises first, second and third elastomeric o-rings respectively disposed at the first, second and third peripheral seals. In some embodiments, the slidable member is further adapted to engage the core assembly at a fourth peripheral seal downstream of the third peripheral seal. In some embodiments, the pressure-regulating valve further comprises at least one check valve disposed in the intake flow path and oriented to obstruct fluid flow from the outlet orifice to the inlet orifice.

In some embodiments, the pressure-regulating valve further comprises a housing that contains the pressure-regulating valve, wherein the housing has access openings adjacent the inlet orifice and the outlet orifice. In some embodiments, the pressure-regulating valve, further comprising gasket seals disposed between the housing and the core assembly proximate the inlet orifice and the outlet orifice. In some embodiments, the housing comprises a recess adapted to receive one end of the slidable member. In some embodiments, the housing comprises two sealably interlocking members.

In some embodiments, the biasing member comprises a coil spring. In some embodiments, the output section comprises support posts engaging the diverter section opposite the intake section. In some embodiments, the collar has an upstream end that is at least partially tapered. In some embodiments, the slidable member is adapted to engage the biasing member. In some embodiments, said at least one outward passage comprises a plurality of outward passages. In some embodiments, the core assembly has a longitudinal axis, and the plurality of outward passages is circularly arranged perpendicular to the longitudinal axis.

Pressure-regulating valves are useful, for example, to control pressure in fluid handing systems such as a water purification apparatus.

Advantageously, pressure-regulating valves according to the present disclosure have a simple design, and are responsive to outlet pressure, typically substantially irrespective of the inlet pressure.

As used herein, the terms "upstream" and "downstream" are used in reference to fluid flow through the pressure regulating valve from the inlet orifice to the outlet orifice.

Features and advantages of the present disclosure will be understood upon consideration of the detailed description as well as the appended claims. These and other features and advantages of the disclosure may be described below in connection with various illustrative embodiments of the disclosure. The above summary is not intended to describe each disclosed embodiment or every implementation of the present disclosure. The Figures and the detailed description which follow more particularly exemplify illustrative embodiments.

While the above-identified drawing figures set forth several embodiments of the present disclosure, other embodiments are also contemplated, as noted in the discussion. In all cases, this disclosure presents the disclosure by way of representation and not limitation. It should be understood that numerous other modifications and embodiments can be devised by those skilled in the art, which fall within the scope and spirit of the principles of the disclosure. The figures may not be drawn to scale. Like reference numbers may have been used throughout the figures to denote like parts.

DETAILED DESCRIPTION

Figure 1A:
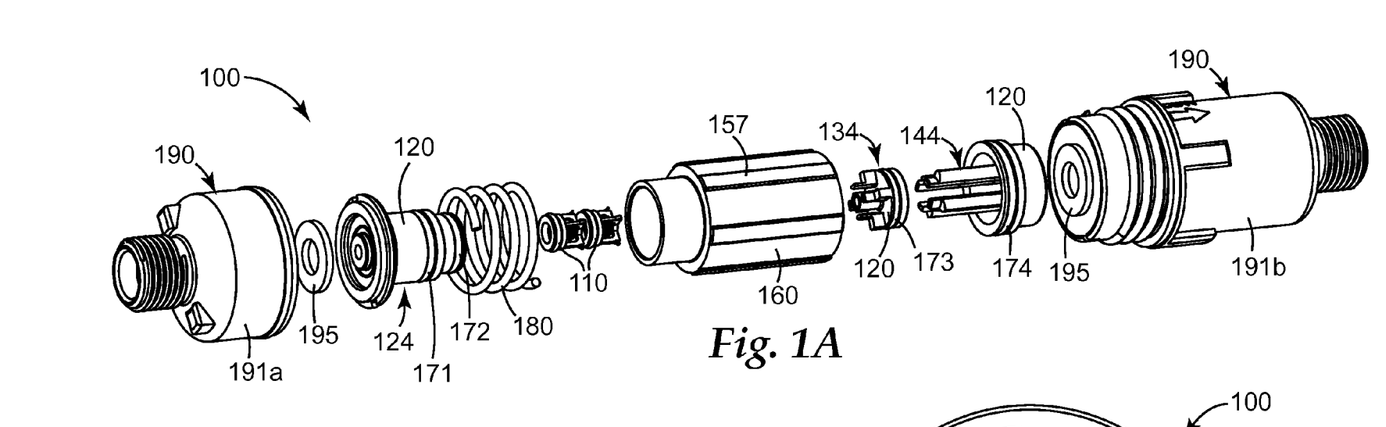
FIG. 1A is an exploded perspective view of an exemplary pressure-regulating valve 100 according to the present disclosure.
Figure 1B:
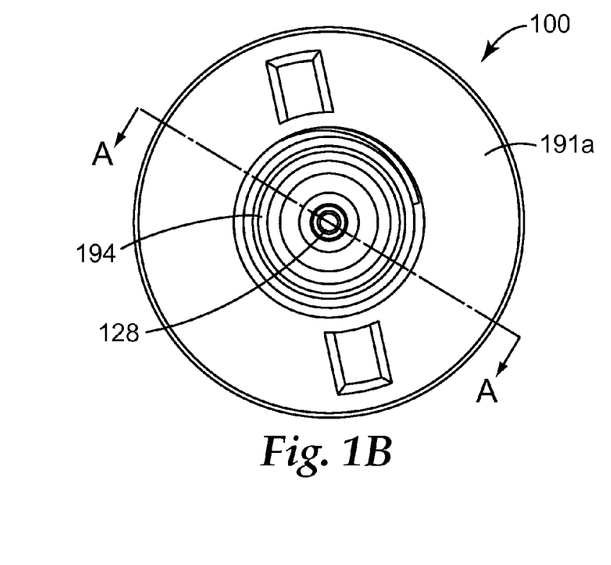
FIG. 1B is an end view of pressure-regulating valve 100 showing line A-A.
Figure 2:
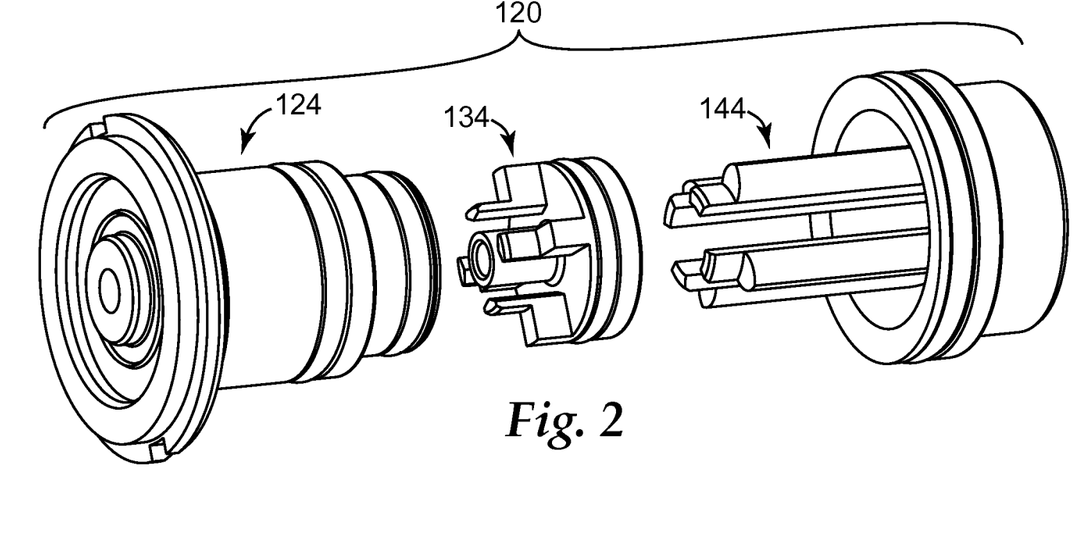
FIG. 2 is an exploded perspective view of core assembly 120.

Referring now to FIGS. 1A and 2, which show an exemplary embodiment of the present disclosure, pressure-regulating valve 100 comprises core assembly 120, a slidable member 160 and a biasing member 180. Optionally, pressure-regulating valve 100 further comprises housing 190 that contains the core assembly 120, slidable member 160 and biasing member 180. Core assembly 120 comprises intake section 124, diverter section 134 and output section 144.

Figure 3:
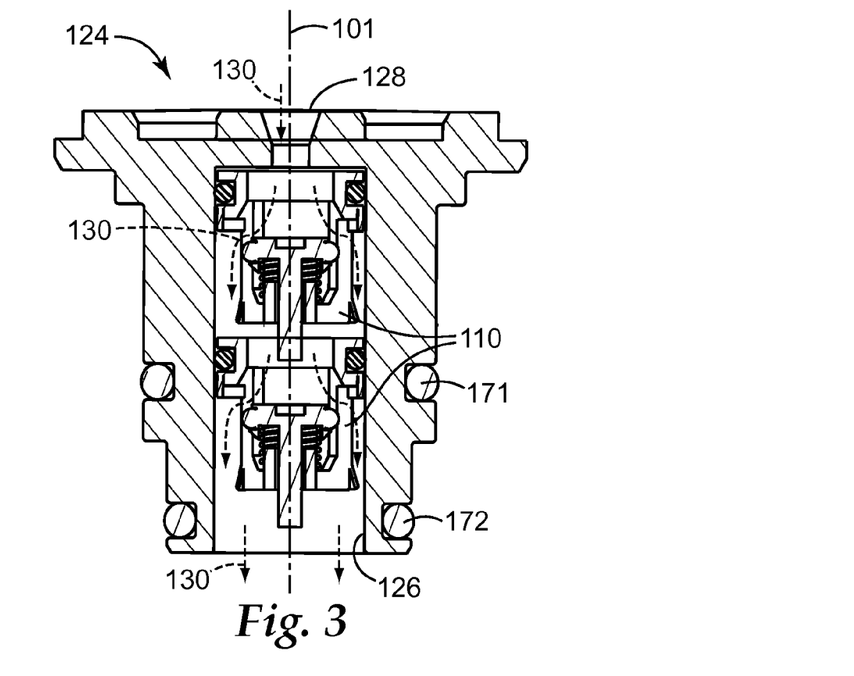
FIG. 3 is a cross-sectional side view of intake section 124 cut along line A-A of FIG. 1B.

Referring now to FIG. 3, intake section 124 comprises a conduit 126 defining intake flow path 130. Typically, the intake section is substantially cylindrical although this is not a requirement; for example, it may be in the shape of a rectangular prism or some other shape. Likewise, the intake flow path is defined by the conduit, and is substantially disposed along a longitudinal axis 101 of the intake section. For example, the intake flow path may be substantially enclosed within the conduit, and oriented along a longitudinal axis of the intake section; for example, as a combination of substantially cylindrical and/or conical shapes. However, in other embodiments, the intake section may not have a longitudinal axis coincident with the intake flow path.

Optionally, check valves 110 may be disposed in the intake flow path 130 and oriented to obstruct fluid backflow through pressure-regulating valve 100 while permitting normal fluid flow from upstream to downstream.

Figure 4:
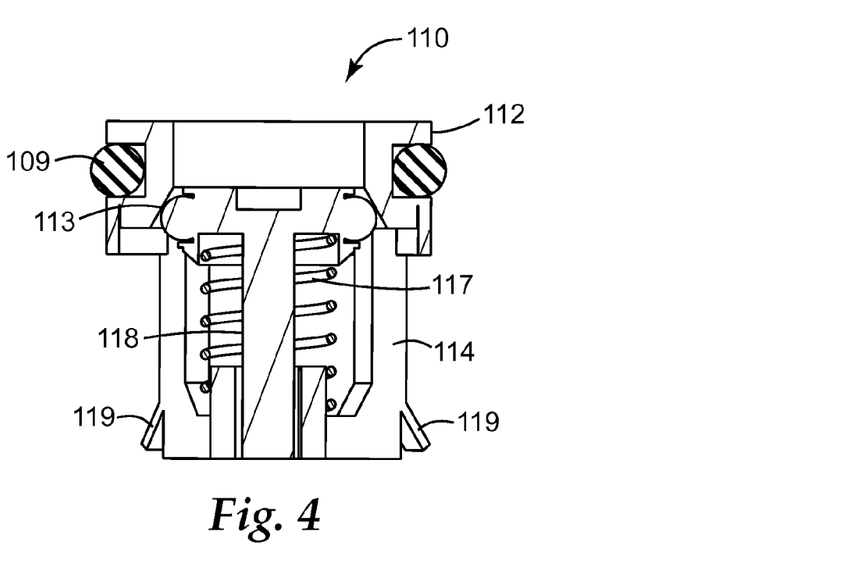
FIG. 4 is a cross-sectional side view of optional check valve 110 cut along line A-A of FIG. 1B.

Referring now to FIG. 4, check valve 110 comprises an annulus 112 with cage structure 114 affixed thereto that retains a valve member 118 adapted to seat against valve seat 113, thereby the closing check valve. In an open position, valve member 118 is retracted from valve seat 113 and fluid can flow through the annulus 112, and hence through check valve 110. Spring 117 biases valve member 118 in a closed position, while fluid pressure in opposition to spring 117 opens check valve 110. o-Ring 109 and flexible spring tabs 119 aid and in sealing and retention of each check valve 110 during installation and use in pressure-regulating valves within conduit 126 (see FIG. 3) according to the present disclosure.

Figure 5:
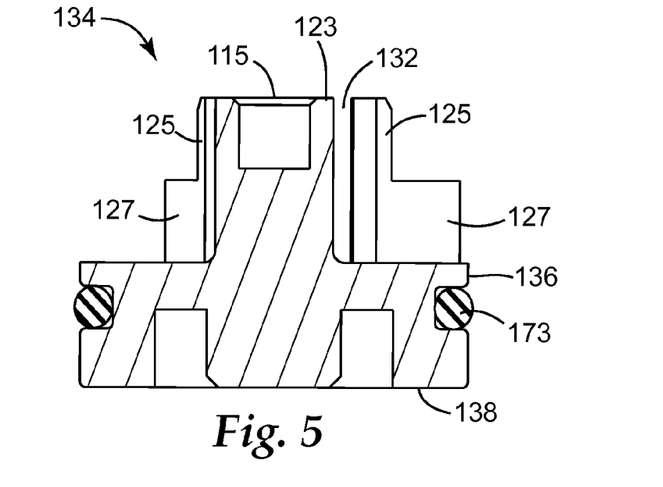
FIG. 5 is a cross-sectional side view of diverter section 134 cut along line A-A of FIG. 1B.

As shown in FIG. 2, diverter section 134 abuts intake section 124. Referring now to FIG. 5, diverter section 134 comprises spacer posts 125 (that abut intake section 124 when assembled) that form openings 132 between conduit 126 (see FIG. 3) and cap 136. Positioning flanges 127 on spacer posts 125 align cap 136 with respect to conduit 126. Optional central post 123 on diverter section 134 supports check valve 110. Central post 123 has a recess 115 which allows check valve 110 to open without interference. Fluid proceeding downstream through intake flow path 130 (see FIG. 3) is outwardly diverted through openings 132 between spacer posts 125. While multiple openings are shown in this embodiment, it is envisaged that a single opening formed (e.g., formed by a single arcuate spacer post) may be sufficient for the pressure-regulating valve to function as intended.

Figure 6:
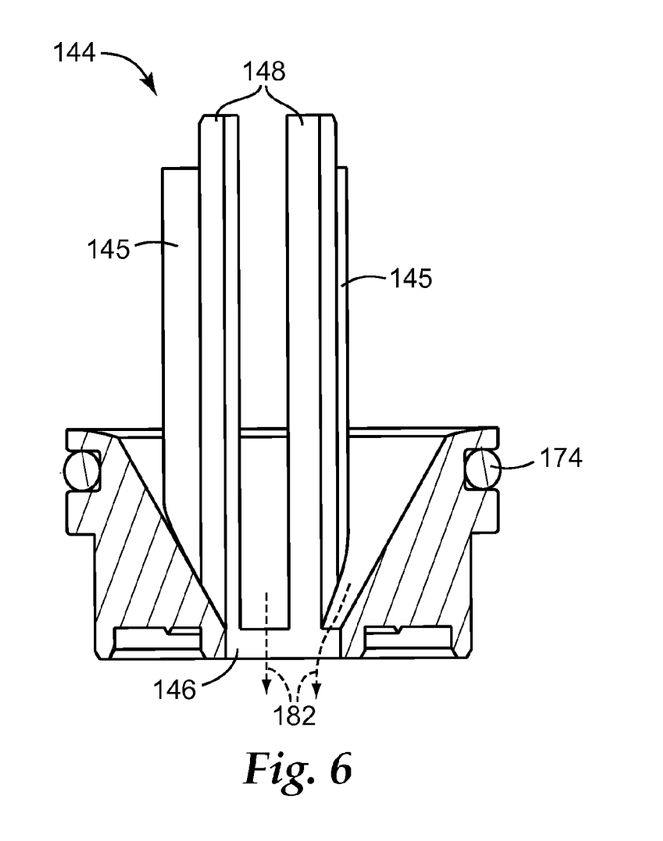
FIG. 6 is a cross-sectional side view of output section 144 cut along line A-A of FIG. 1B.

As shown in FIG. 2, output section 144 abuts diverter section 134. Referring now to FIG. 6, outlet section 144 comprises support posts 145 with alignment flanges 148 and outlet orifice 146, and defines outlet path 182. Support posts 145 abut cap 136 opposite conduit 126 (see FIG. 3), and are positioned by engaging alignment flanges 148 on support posts 145 with centering flange 138 on cap 136 (see FIG. 5).

The intake section, diverter section and output section may be discrete parts (for example, the intake section and the diverter section may be discrete parts to facilitate installation of the optional check valve during manufacture), or two or three of them may be integrally combined as a single part.

Figure 7:
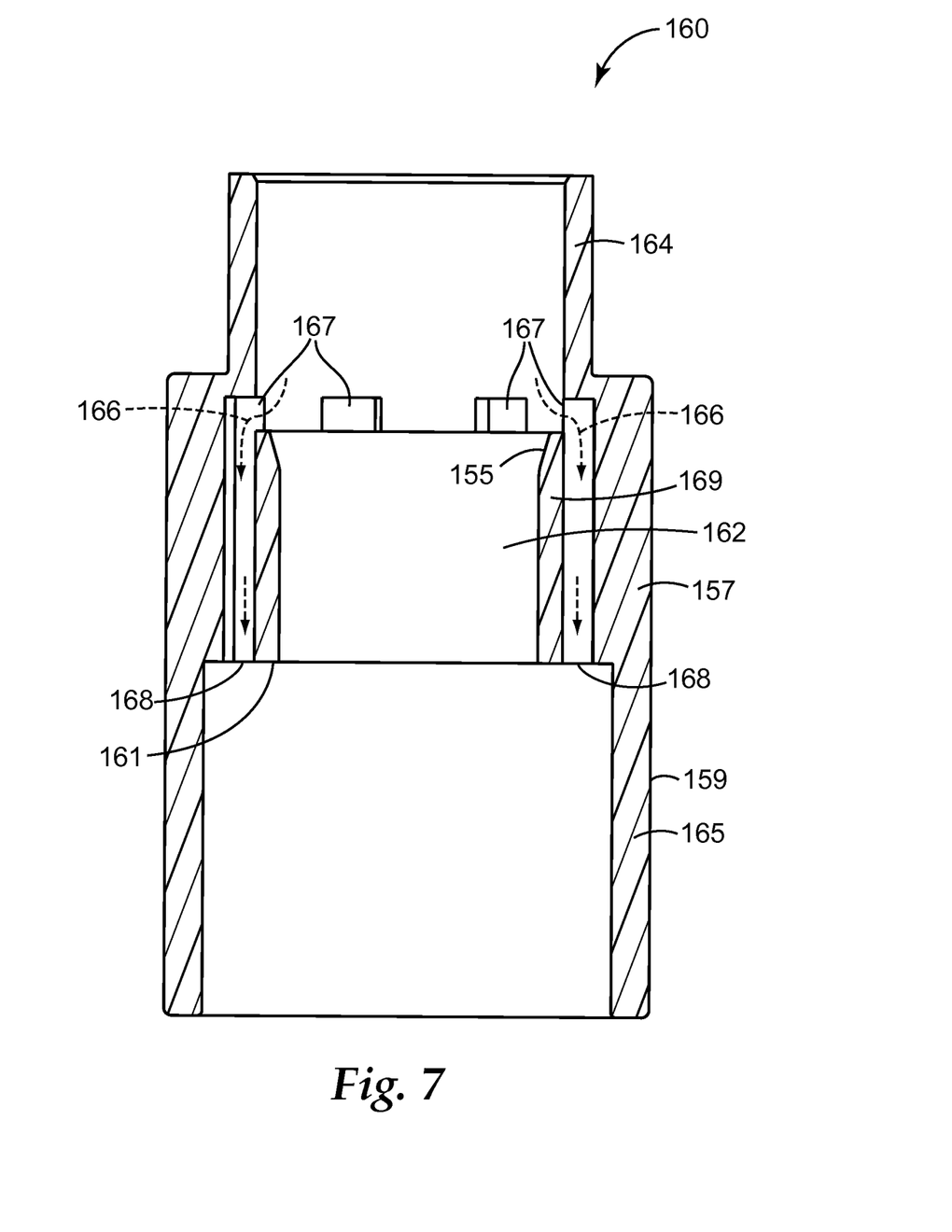
FIG. 7 is a cross-sectional side view of slidable member 160 cut along line A-A of FIG. 1B.

Referring now to FIG. 7, slidable member 160 has inner surface 162 that forms peripheral seals together with core assembly 120. Slidable member 160 engages core assembly 120 and is slidable between a first (open) position 121 (shown in FIG. 8A) and a second (closed) position 122 (shown in FIG. 8B).

Figure 8A:
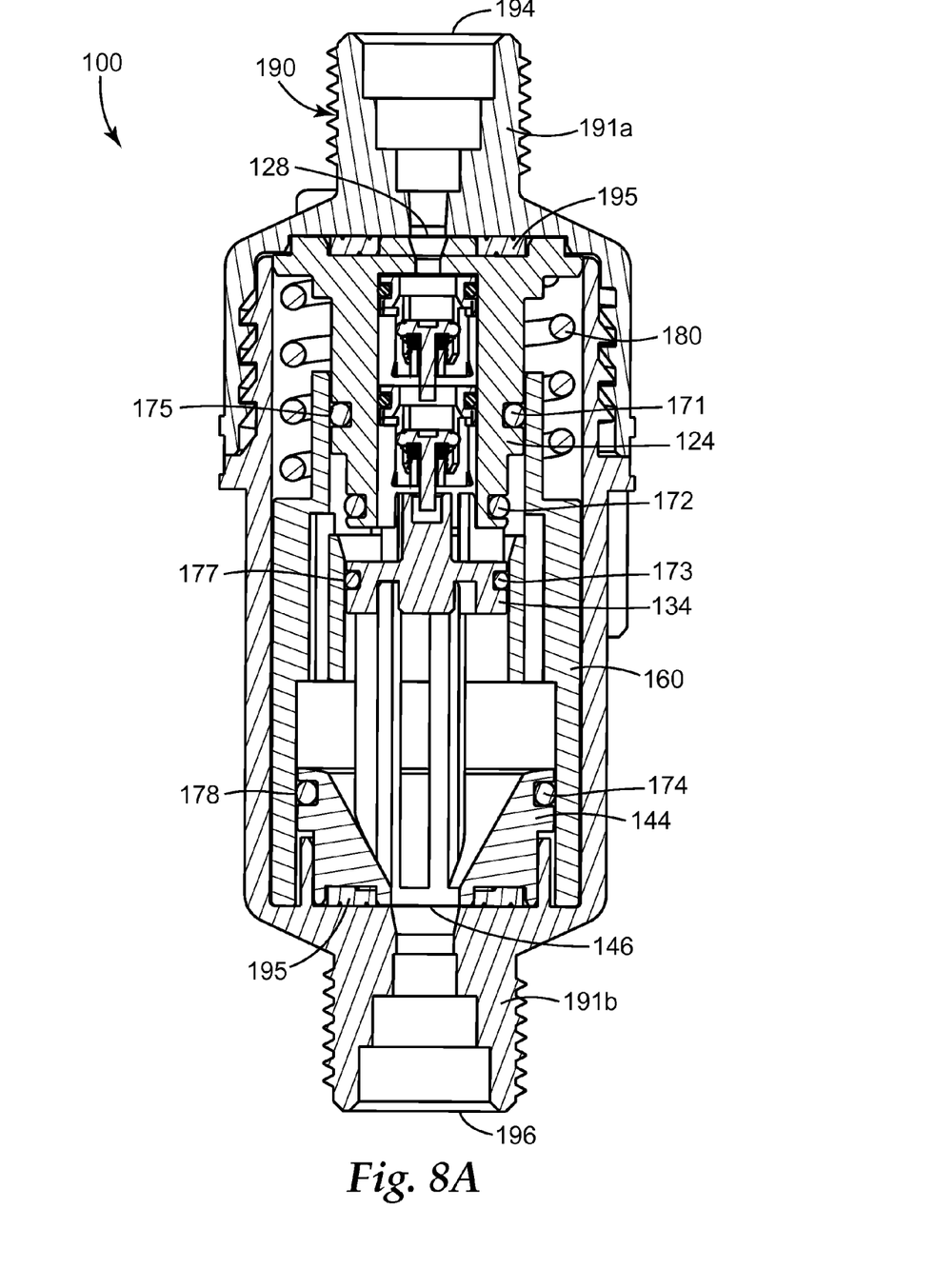
FIG. 8A is a cross-sectional side view of pressure-regulating valve 100, cut along line A-A of FIG. 1B, in an open configuration.
Figure 8B:
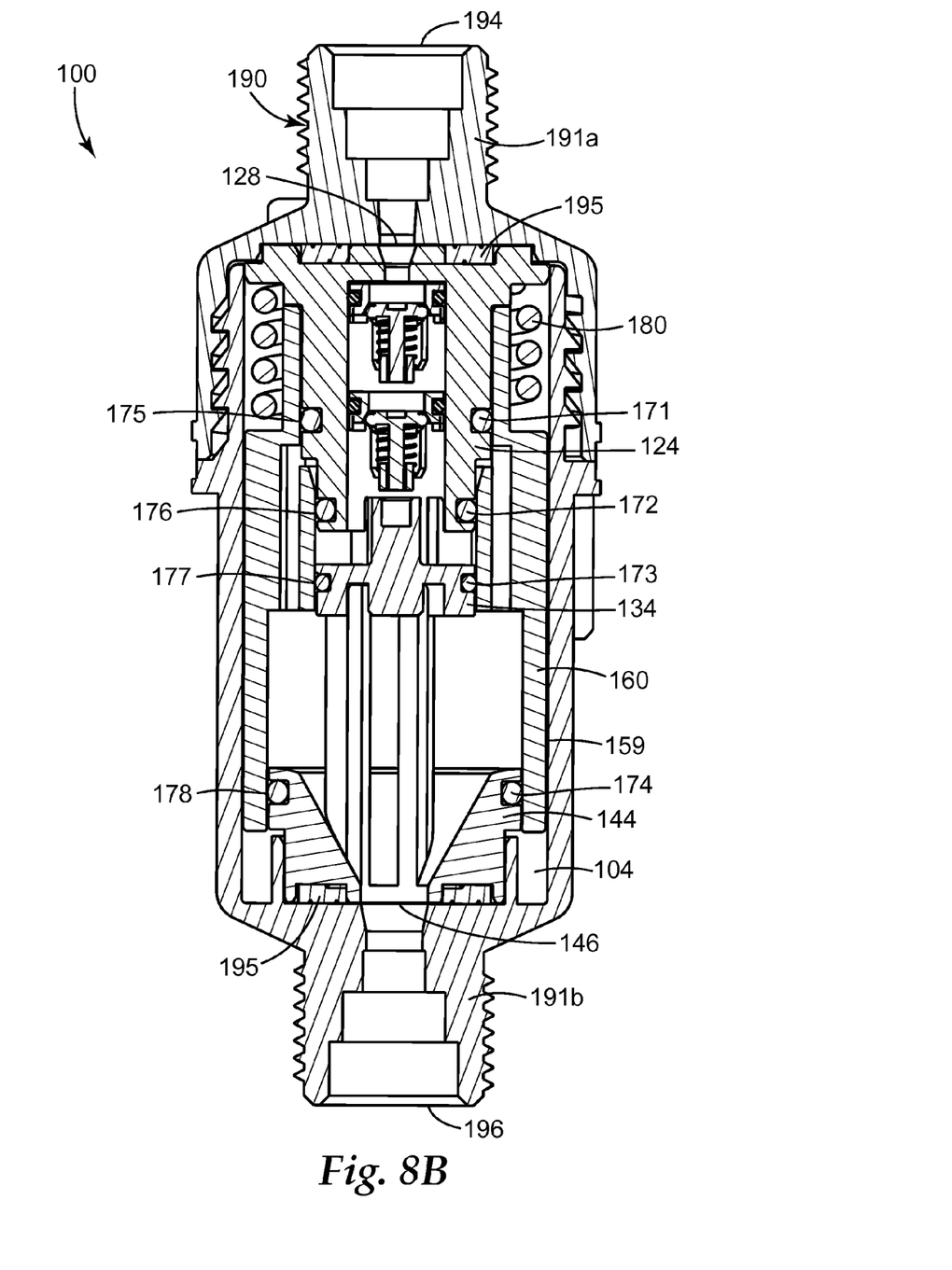
FIG. 8B is a cross-sectional side view of pressure-regulating valve 100, cut along line A-A of FIG. 1B, in a closed configuration.

Referring to FIGS. 8A and 8B, core assembly 120 is fitted with elastomeric o-rings (171, 172, 173, 174) seated thereon, and disposed between core assembly 120 and slidable member 160, that form first, second, third and fourth respective peripheral seals (175, 176, 177, 178) when the valve is closed (see FIG. 8B). When pressure-regulating valve 100 is open only the first, second and fourth peripheral seals are present. It is envisaged that alternative methods of achieving a seal may also used such as, for example, an interference fit, or a fiber gasket. Similarly, the o-rings may also be seated on the slidable member. Configurations wherein a portion of the elastomeric o-rings (or other sealing members) are seated on each of the core assembly and the slidable member are also envisaged.

Referring again to FIG. 7, an upstream portion 164 of slidable member 160 engages core assembly 120 at first peripheral seal 175 (see FIGS. 8A, 8B). A downstream portion 165 of slidable member 160 contacts upstream portion 164 and defines internal flow paths 166, each terminating at openings (167, 168) in inner surface 162. Collar 169, which is contiguous with downstream portion 165, is adapted to engage the core assembly at second and third respective peripheral seals (176, 177) (see FIGS. 8A, 8B). As shown, collar 169 has a tapered leading edge 155, which may facilitate sliding past o-rings, although this is not a requirement. Slidable member 160 is adapted to engage the biasing member 180. Slidable member 160 is adapted to engage the core assembly at a fourth peripheral seal 178 (see FIGS. 8A, 8B) located downstream of the third peripheral seal 177.

If optional housing 190 is present, core assembly 120 is optionally fitted with elastomeric gasket seals 195 that form fluid-tight seals with the housing. Referring again to FIG. 1A, elastomeric gasket seals 195 are seated in core assembly 120 and form fluid-tight seals with housing 190. It is envisaged that alternative methods of achieving a seal may also used such as, for example, an interference fit, or an elastomeric o-ring. Similarly, the gaskets may also be seated in the housing. Configurations wherein a portion of the elastomeric o-rings (or other sealing members) are seated on each of the core assembly and the housing are also envisaged.

Referring now to FIGS. 1A, 7, 8A and 8B, biasing member 180, shown as a compressed coil spring engages flange 164 and intake section 124 and urges slidable member 160 from first position 121 toward the second position 122. As outlet fluid pressure rises, increased fluid pressure against pressure surface 161 acts against biasing member 180 until it eventually it is sufficient to cause the slidable member to move from first position (open, shown in FIG. 8A) toward second position (closed, shown in FIG. 8B). By adjusting the force of biasing member 180 and the area of surface 161, it is possible to determine the outlet fluid pressure that will cause the valve to close. It is envisaged that implementations of the biasing member other than a compressed coil spring can be used such as, for example, magnets, leaf springs, or stretched elastic bands or coil springs attached to the core assembly downstream of the slidable member.

Pressure-regulating valves according to the present disclosure may include an optional housing that protects the core assembly, the slidable member and the biasing member from damage, and contains any fluid leakage that may occur. Referring again to FIG. 1A, optional housing 190 comprises first and second engageable (typically sealably interlocking) housing members 191a, 191b that engage by male and female screw threads 193a, 193b. Referring now to FIG. 8B, housing 190 has first and second access openings (194, 196) adjacent inlet and outlet orifices (128, 146), respectively. Housing member 191b comprises a recessed channel 104 adapted to receive the downstream end of slidable member 160. Optionally, the outer surface 159 of slidable member 160 may have ribs 157 (see FIG. 1A) that reduce stiction with housing 190.

Pressure-regulating valves according to the present disclosure may be made of any suitable materials including, for example, metal, plastic, rubber, glass, ceramic, and combinations thereof. For example, one or more components of the pressure-regulating valve may be fabricated from injection molded plastic (e.g., a food contact grade plastic).

Pressure-regulating valves according to the present disclosure are useful, for example, for regulating fluid pressure in fluid handling equipment (e.g., water purification apparatuses) as a function of outlet fluid pressure; for example, as opposed to inlet pressure.

Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A pressure-regulating valve comprising:
a core assembly having first, second, third, and fourth elastomeric o-rings seated thereon, the core assembly comprising:
an intake section comprising a conduit defining an inlet orifice and an intake flow path;
a diverter section comprising a cap adjacent at least one spacer abutting the conduit and creating at least one outward passage in fluid communication with the intake flow path; and
an output section abutting the diverter section, wherein the output section has an outlet orifice and defines an output flow path;
a slidable member having an inner surface engaging the core assembly and slidable between a first position and a second position, and wherein the slidable member comprises:
an upstream portion that engages the core assembly at a first peripheral seal wherein the first elastomeric o-ring is disposed at the first peripheral seal; and
a downstream portion in contact with the upstream portion and defining an internal flow path terminating at first and second openings at the inner surface, wherein the downstream portion comprises:
a pressure surface facing downstream;
a collar adapted to engage the core assembly at a second peripheral seal and a third peripheral seal, wherein the second and third elastomeric o-rings are respectively disposed at the second and third peripheral seals,—wherein the second peripheral seal is disposed between the first peripheral seal and the third peripheral seal; and
a biasing member that urges the slidable member from the second position toward the first position, wherein:
if the slidable member is in the first position, the outlet orifice and the inlet orifice are in fluid communication through the internal flow path,
if the slidable member is in the second position, the outlet orifice and the inlet orifice are not fluid communication through the internal flow path,
the slidable member is adapted to engage the fourth elastomeric o-ring to form a fourth peripheral seal downstream of the third peripheral seal,
and
wherein, in response to a downstream fluid pressure against the pressure surface, the slidable member is movable from the first position toward the second position.

2. The pressure-regulating valve of claim 1, wherein the intake section, the diverter section and the output section are discrete bodies.

3. The pressure-regulating valve of claim 1, wherein at least two of the intake section, the diverter section and the output section are integrally formed as a single body.

4. The pressure-regulating valve of claim 1, wherein the third peripheral seal is disposed on the diverter section.

5. The pressure-regulating valve of claim 1, further comprising at least one check valve disposed in the intake flow path and oriented to obstruct fluid flow from the outlet orifice to the inlet orifice.

6. The pressure-regulating valve of claim 1, further comprising gasket seals disposed between the housing and the core assembly proximate the inlet orifice and the outlet orifice.

7. The pressure-regulating valve of claim 1, wherein the housing comprises a recess adapted to receive one end of the slidable member.

8. The pressure-regulating valve of claim 1, wherein the housing comprises two sealably interlocking members.

9. The pressure-regulating valve of claim 1, wherein the biasing member comprises a coil spring.

10. The pressure-regulating valve of claim 1, wherein the output section comprises support posts engaging the diverter section opposite the intake section.

11. The pressure-regulating valve of claim 1, wherein the slidable member is adapted to engage the biasing member.

12. The pressure-regulating valve of claim 1, wherein said at least one outward passage comprises a plurality of outward passages.

13. The pressure-regulating valve of claim 12, wherein the core assembly has a longitudinal axis, and wherein the plurality of outward passages is circularly arranged perpendicular to the longitudinal axis.

\* \* \* \* \*